JOSHUA MERRILL, OF BOSTON, MASSACHUSETTS.

*Letters Patent No. 89,493, dated April 27, 1869.*

IMPROVEMENT IN THE MANUFACTURE OF ROSIN-OIL.

The Schedule referred to in these Letters Patent and making part of the same.

Be it known that I, JOSHUA MERRILL, of Boston, in the county of Suffolk, and State of Massachusetts, have invented a certain new and improved Rosin-Oil, suitable for lubricating-oil, for curriers' use, and other purposes; and I do hereby declare that the following is a full and correct description thereof.

My invention relates to the production of a rosin-oil, free from the characteristic disagreeable and fetid odors which have heretofore been present in manufactured rosin-oils, notwithstanding the attempts that have been made to remove them by treatment with chemicals.

To produce rosin-oil free from disagreeable odors, and having only a slight smell, like a fatty oil, I place distilled rosin-oil, such as is found in the market, in a still heated in any manner, and raise the temperature gradually until the oil begins to distil over. The first oil that comes over will be a thin naphthaly oil, very odorous, and not suitable for lubricating, or curriers' use. I continue the distillation until the oil coming over reaches from 18° to 14° Baumé's hydrometer, and then stop the process of distillation by discontinuing the application of heat to the still, and let the still cool down sufficiently to safely withdraw the remaining oil from the still.

This oil is the product claimed as my invention. It is free from all odor, except a slight smell, like fatty oil, and is much more oily in its nature than the oil from which it is made.

The process may be conducted in a still heated by fire beneath, but will be facilitated by the introduction of superheated steam into the body of the oil, during distillation, which enables the process to be conducted at a lower temperature, and an oil of lighter color to be produced.

In carrying on the process, I generally distil off from eight to twelve per cent. of the contents of the still before the oils reach the gravities above mentioned.

I prefer to use apparatus for distilling patented by me, July 30, 1861, and improved subsequently by the introduction of a superheating apparatus, described and set forth in a separate specification.

I claim the within-described rosin-oil, produced and deodorized substantially as described.

JOSHUA MERRILL.

Witnesses:
F. C. TREADWELL, Jr.,
JAMES S. GRINNELL.